(12) United States Patent
Liu

(10) Patent No.: US 8,284,487 B1
(45) Date of Patent: Oct. 9, 2012

(54) LARGE FORMAT TILED PROJECTION DISPLAY SCREEN WITH FLEXIBLE SURFACE FILM

(75) Inventor: Yufeng Liu, Woodbury, MN (US)

(73) Assignee: 3M Innovative Properties Company, Saint Paul, MN (US)

(*) Notice: Subject to any disclaimer, the term of this patent is extended or adjusted under 35 U.S.C. 154(b) by 0 days.

(21) Appl. No.: 13/306,004

(22) Filed: Nov. 29, 2011

(51) Int. Cl.
*G03B 21/56* (2006.01)
*G03B 21/60* (2006.01)

(52) U.S. Cl. ........................ 359/449; 359/453

(58) Field of Classification Search ............... 359/449, 359/451, 460, 453
See application file for complete search history.

(56) References Cited

U.S. PATENT DOCUMENTS

| | | | |
|---|---|---|---|
| 4,473,355 A * | 9/1984 | Pongratz | 434/44 |
| 4,866,530 A | 9/1989 | Kalua | |
| 5,523,790 A | 6/1996 | Kalua | |
| 5,612,741 A * | 3/1997 | Loban et al. | 348/383 |
| 5,828,410 A | 10/1998 | Drapeau | |
| 5,993,005 A | 11/1999 | Geranio | |
| 6,296,214 B1 | 10/2001 | Mannick | |
| 6,822,792 B2 * | 11/2004 | Goto | 359/456 |
| 6,912,086 B2 * | 6/2005 | Honda | 359/449 |
| 6,930,832 B1 * | 8/2005 | Parkin et al. | 359/449 |
| 7,583,437 B2 * | 9/2009 | Lipton et al. | 359/451 |
| 2008/0218853 A1 * | 9/2008 | El-Ghoroury et al. | 359/449 |
| 2010/0053748 A1 * | 3/2010 | Rohner et al. | 359/460 |
| 2011/0157695 A1 * | 6/2011 | Katsenelenson et al. | 359/449 |

* cited by examiner

*Primary Examiner* — Christopher Mahoney

(57) ABSTRACT

A large format tiled flexible projection display screen. The tiled modules of the screen each include a rear projection screen film adhered to a transmissive flexible substrate with an optically clear adhesive. When electronic content is projected onto the tiled projection screens, the electronic content is visible on a front surface side of the substrates.

23 Claims, 2 Drawing Sheets

LARGE FORMAT TILED PROJECTION DISPLAY SCREEN WITH FLEXIBLE SURFACE FILM

BACKGROUND

Large format tiled displays are widely used in command and control centers due to their superb contrast and relatively small seams. The current construction of these displays utilizes a rigid front surface to which display films are laminated. The projector is placed behind the screen to project the image. The size of individual screen can range from 40 inches up to 80 inches in diagonal size. FIG. 1 illustrates an example of such a display product 10 shown in a 2×3 configuration with six 60 inch modules providing approximately 160 inches diagonal total screen area. The tiled modules create a horizontal seam 15 between the top and bottom modules, vertical seams 11 and 12 between the top three modules, and vertical seams 13 and 14 between the bottom three modules. These seams create optical borders ranging from about 1 mm to 5 mm in width.

The common rigid substrate materials used for the tiled screens are glass and acrylic. The thickness of the substrates ranges from 3 mm to 10 mm. The limitations of the current constructions include the following: expensive and heavy substrate materials; a potential hazard in the event of the glass substrate breaking and falling; environmental warping in the case of acrylic substrates due to change in humidity and temperature; and several seams between substrates affecting display quality.

SUMMARY

A large format tiled projection display screen, consistent with the present invention, includes first and second modules tiled together with an adhesive. The first and second modules each include a projection screen film adhered to a transmissive flexible substrate with an optically clear adhesive. When electronic content is projected onto the tiled projection screen films, the electronic content is visible on a front surface side of the substrates.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figure 1:
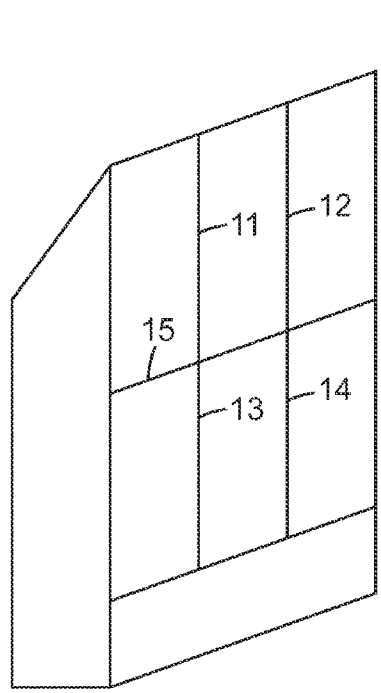
FIG. 1 is a diagram illustrating a prior art tiled projection display.
Figure 2:
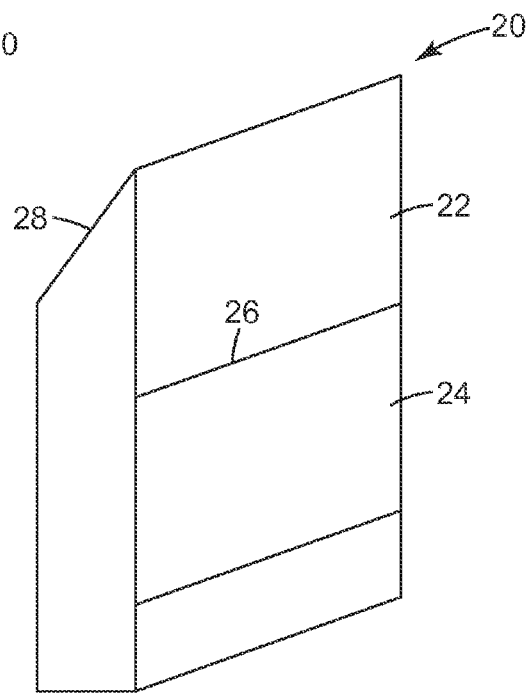
FIG. 2 is a diagram illustrating an embodiment of a flexible projection screen.

Embodiments of the present invention include a flexible display film that enables a projection video wall display with a minimum number of seams and minimized seam width when tiled together. The display film includes display modules with a flexible substrate capable of being tension mounted. FIG. 2 is a diagram illustrating an embodiment of a flexible projection screen 20, which includes flexible display modules 22 and 24 tiled together and creating a single seam 26. The tiled display modules can be tension mounted in a frame 28 using, for example, rubber bands or springs. This embodiment can thus, for example, virtually eliminate the vertical seams and leave seams in only one direction in the thickness range of 0.01 mm to 0.5 mm.

Figure 3:
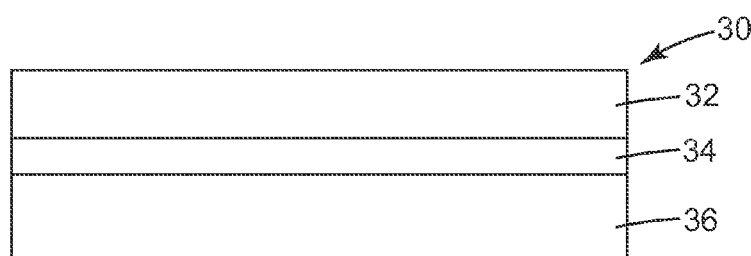
FIG. 3 is a diagram of the construction of a first module of a two-line flexible projection screen.
Figure 4:
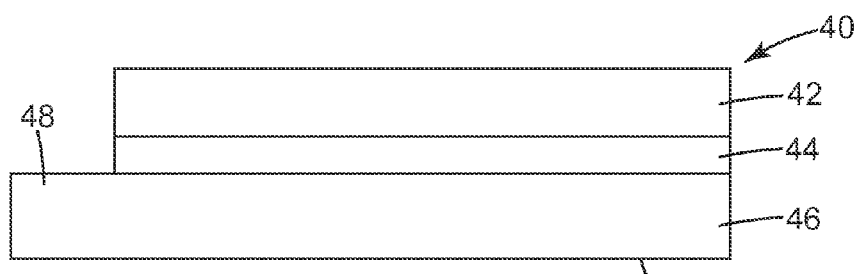
FIG. 4 is a diagram of the construction of a second module of a two-line flexible projection screen.
Figure 5:
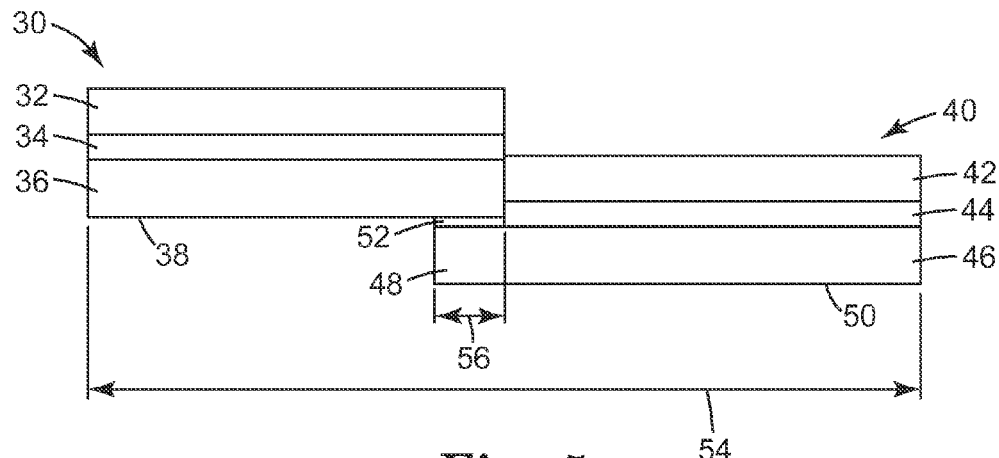
FIG. 5 is a diagram of the construction of a two-line projection screen combining the first and second modules shown in FIGS. 3 and 4.

FIGS. 3-5 illustrate a two-line flexible display screen. FIG. 3 is a diagram of the construction of a first module 30 of the two-line flexible projection screen. First module 30 includes a projection screen film 32 and a flexible substrate film 36 providing a front surface side 38 for first module 30. An adhesive 34 is used to adhere substrate 36 to projection screen film 32. In first module 30, projection screen film 32 and substrate 36 have approximately the same width as shown. FIG. 4 is a diagram of the construction of a second module 40 of a two-line flexible projection screen. Second module 40 includes a projection screen film 42 and a flexible substrate film 46 providing a front surface side 50 for second module 40. An adhesive 44 is used to adhere substrate 46 to projection screen film 42. In second module 40, substrate 46 has a portion 48 such that the substrate has a greater width than projection screen film 42 and adhesive 44. FIG. 5 is a diagram of the construction of a two-line projection screen combining the first and second modules 30 and 40 to make a tiled screen. Portion 48 of substrate 46 forms a seam edge and is adhered to the front surface side 38 of substrate 36 using a seaming adhesive 52. The tiled modules provide for a total display width 54 (short axis) with a seam width 56.

Figure 6:
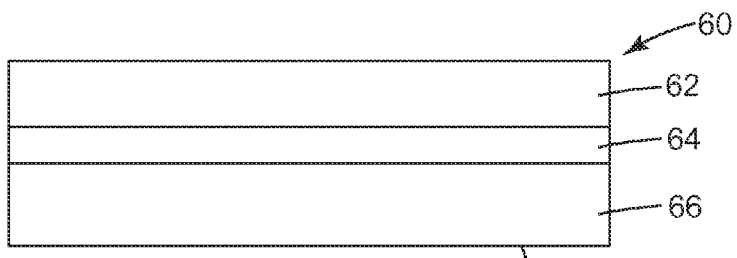
FIG. 6 is a diagram of the construction of a module of a three-line flexible projection screen.
Figure 7:
FIG. 7 is a diagram of the construction of seaming tape for a three-line flexible projection screen.
Figure 8:
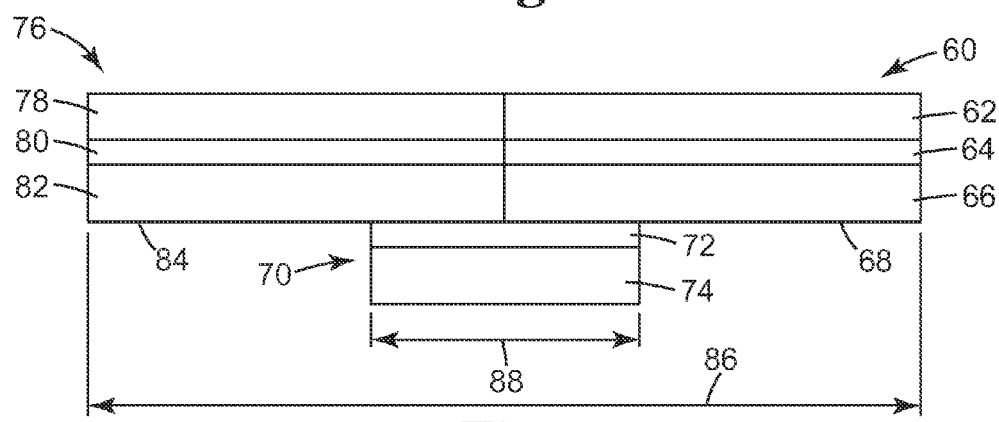
FIG. 8 is a diagram of the construction of a three-line projection screen combining two modules of FIG. 6 with the seaming tape shown in FIG. 7.

FIGS. 6-8 illustrate a three-line flexible projection screen. FIG. 6 is a diagram of the construction of a module 60 of a three-line flexible projection screen. Module 60 includes a projection screen film 62 and a flexible substrate film 66 providing a front surface side 68 for module 60. An adhesive 64 is used to adhere substrate 66 to projection screen film 62. In module 60, projection screen film 62 and substrate 66 have approximately the same width as shown. FIG. 7 is a diagram of the construction of a seaming tape 70 for a three-line flexible projection screen. Seaming tape 70 has a flexible substrate film 74 with an adhesive 72. FIG. 8 is a diagram of the construction of a three-line projection screen combining two modules of FIG. 6 with seaming tape 70. In FIG. 8, module 60 is tiled with another module 76 having substantially the same construction. In particular module 76 includes a projection screen film 78 and a flexible substrate film 82 providing a front surface side 84 with an adhesive 80 used to adhere them together. In order to tile module 60 with module 76, adhesive 72 of seaming tape 70 is adhered to front surface sides 68 and 84 of modules 60 and 76, respectively. The tiled modules provide for a total display width 86 (short axis) with a seam width 88.

Two modules are shown tiled in the embodiments above for illustrative purposes only. Other embodiments can include additional modules (projection screen film adhered to a flexible substrate) tiled together in a vertical direction, a horizontal direction, or both. In use, a rear projector provides electronic content projected onto the tiled projection screen such that the content is visible to a user on the front surface side.

The following are exemplary materials for the embodiments shown in FIGS. 3-8 and other embodiments of the present invention. The projection screen film can be implemented with any high contrast rear projection screen. An example of such a screen film is 3M VIKUITI Rear Projection Film (3M Co., St. Paul, Minn.), which includes glass micro lenses (glass beads) partially embedded in a light absorbing black PVC matrix on a clear PVC carrier. The carrier layer of the screen film can be made out of acrylic, vinyl, or polyethylene terephthalate (PET). The screen film may incorporate beads, pigments, and reflective particles such as silver or aluminum. The screen film surface which faces away from the adhesive may comprise a designed surface topology, which may include micro-lenses or micro-louver structures, or both. The screen film's brightness gain is typically from 0.9 to 5.0. The screen film's contrast in ambient light ranges from 30:1 to 10000:1. The screen film for each module of the tiled display can be 30 inches to 100 inches wide, for example.

The substrate layer provides flexibility, optical transmission, mechanical strength, and anti-glare functions for the flexible screen film. The substrate layer may be selected from any flexible and transparent materials among which are polyester, vinyl, polyurethane, and polycarbonate. The modulus of the substrate film may be from 0.1 GPa to 3 GPa, or from 0.5 GPa to 1 GPa. The thickness of the substrate film may be from 2 mils to 50 mils, or from 5 mil to 20 mil. The visible light transmission may be at least 50%, or preferably at least 80%. The tensile strength may be from 10 lbs per square inch to 150 lbs per square inch. The front surface of the substrate film may have anti-glare function such that the 60° gloss is below 20%, or below 10%. The substrate layer can be 30 inches to 100 inches wide, for example.

The adhesive layer may be selected from a group of adhesives such as pressure sensitive adhesives, UV curable adhesives, heat activated adhesives, or thermally cured adhesives. The adhesive layer has at least 70% visible light transmission, or at least 80% visible light transmission. The adhesive strength is at least 200 grams per inch, or at least 500 grams per inch. The adhesive layer can be 30 inches to 100 inches wide, for example.

The integrated projection system of this invention may contain multiple singular projection units with a seamed flexible rear projection screen of this invention. Some exemplary configurations of projection units include 1×2, 1×3, 1×4, 1×5, 1×6, 2×1, 2×2, 2×3, 2×4, 2×5, 2×6, 3×1, 3×2, 3×3, 3×4, 3×5, 3×6, 3×7, 4×1, 4×2, 4×3, 4×4, 4×5, 4×6, 4×7, 4×8, 5×1, 5×2, 5×3, 5×4, 5×5, 5×6, 5×7, 5×8, 5×9, and 5×10.

EXAMPLES

Example 1

Example 1 was a tiled screen according to the embodiment shown in FIGS. 3-5. In this Example, a large flexible screen of 96 inch wide and 200 inch long was made with a 2-line seam. The 46 inch wide modules were constructed as shown in FIGS. 3 and 4. For each module, a high contrast projection screen (3M VIKUITI Rear Projection Film, 3M Co., St. Paul, Minn.) was carefully laminated to a substrate (10 mil polycarbonate film), using the optical adhesive supplied on the 3M VIKUITI Rear Projection Film as the adhesive. The width of the substrate film was intentionally made greater than the width of the projection screen film for one of the two modules, so as to create the seam edge portion shown in FIG. 4. The seam edge portion—i.e., the extension of the substrate film beyond the length of the projection screen film—was about 1 inch wide.

A 1 inch wide adhesive layer (3M Optically Clear Adhesive 8171, 3M Co., St. Paul, Minn.) of 200 inch long was used to join the two 48 inch wide modules together. The 1 inch wide adhesive layer was first laminated to the side opposite to the front surface side of the screen edge portion of one module, and then the release liner of the 8171 adhesive product was peeled off, and the newly exposed surface of the adhesive was laminated to the second module on its front surface side, as shown is FIG. 5. The resulting tiled screen film was flexible. The optical performance at the joint (seam) was comparable to that of the rest of the screen. The tensile strength was about 80 lbs per square inch, which is excellent for a tension mounted frame screen. The seam was not conspicuous, and the center joint seam width was less than 0.3 mm on average.

Example 2

Example 2 was a tiled screen according to the embodiment shown in FIGS. 6-8. In this Example, a large flexible screen of 96 inch wide and 200 inch long was made with a 3-line seam. The 48 inch film modules were constructed as shown in FIG. 6. For each module, a high contrast projection screen (3M VIKUITI Rear Projection Film, 3M Co., St. Paul, Minn.) was carefully laminated to a substrate film (10 mil polycarbonate film), using the optical adhesive supplied on the 3M VIKUITI Rear Projection Film as the adhesive. For each module, the width of the substrate film was the same as the width of the projection screen film.

A 2 inch wide seaming tape was constructed by laminating an optically clear adhesive (3M Optically Clear Adhesive 8171, 3M Co., St. Paul, Minn.) to a 10 mil polycarbonate substrate film. This seaming tape was used to join the two 48 inch wide flexible screen films to produce a 96 inch wide flexible tiled screen film, as shown in FIG. 8.

The 2 inch wide seaming tape was used to carefully join the two 48 inch wide screen films. Attention was paid to make sure the tape was applied properly aligned and centered so the adhesive coverage was equal on each side of the seam. The resulting screen was flexible and about 96 inch wide. The overlap area under the seaming tape had comparable optical performance to the rest of the screen area. The tensile strength was about 80 lbs per square inch at the seam, which is excellent for a tension mounted frame screen. The seam was not conspicuous, and the center joint seam width was less than 0.3 mm on average.

The invention claimed is:

1. A large format tiled projection display screen, comprising:
   a first module, comprising:
      a first projection screen film;
      a first transmissive flexible substrate having a front surface side and
      an optically clear adhesive between the first projection screen film and the first substrate; and
   a second module, comprising:
      a second projection screen film;
      a second transmissive flexible substrate having a front surface side and
      an optically clear adhesive between the second projection screen film and the second substrate,
      wherein one of the first or second substrates is a greater size than its corresponding projection screen film,
      wherein the first module is joined to the second module to provide a tiled projection display screen, wherein when electronic content is projected onto the first and second projection screen films, the electronic content is visible on the front surface sides of the first and second substrates.

2. The display screen of claim 1, wherein the first and second projection screen films each comprise a high contrast rear projection screen.

3. The display screen of claim 2, wherein the rear projection screen comprises beads.

4. The display screen of claim 1, wherein the first and second substrates each comprise a polymeric film.

5. The display screen of claim 4, wherein a polymer for the substrate polymeric film is selected from polyurethane, vinyl, polyester, or polycarbonate.

6. The display screen of claim 1, wherein the first and second projection screen films are each at least approximately 30 inches wide.

7. The display screen of claim 1, wherein the front surface sides of the first and second substrates have an anti-glare function.

8. A large format tiled projection display screen, comprising:
a first module, comprising:
a first projection screen film;
a first transmissive flexible substrate having a front surface side; and
an optically clear adhesive between the first projection screen film and the first substrate; and
a second module, comprising:
a second projection screen film;
a second transmissive flexible substrate having a front surface side; and
an optically clear adhesive between the second projection screen film and the second substrate,
wherein the first module is joined to the second module to provide a tiled projection display screen,
wherein when electronic content is projected onto the first and second projection screen films, the electronic content is visible on the front surface sides of the first and second substrates,
wherein the second substrate is wider than the second projection screen film and includes a seam edge portion, wherein the first substrate is adhered to the seam edge portion.

9. The display screen of claim 8, wherein the screen includes only a single seam formed at the seam edge portion.

10. The display screen of claim 8, wherein the seam edge portion is approximately 1 inch wide.

11. A large format tiled projection display screen, comprising:
a first module, comprising:
a first projection screen film;
a first transmissive flexible substrate having a front surface side; and
an optically clear adhesive between the first projection screen film and the first substrate; and
a second module, comprising:
a second projection screen film;
a second transmissive flexible substrate having a front surface side; and
an optically clear adhesive between the second projection screen film and the second substrate,
wherein the first module is joined to the second module to provide a tiled projection display screen,
wherein when electronic content is projected onto the first and second projection screen films, the electronic content is visible on the front surface sides of the first and second substrates,
further comprising a seaming tape joining the first substrate to the second substrate, the seaming tape being adhered to each of the first substrate and second substrate.

12. The display screen of claim 11, wherein the seaming tape comprises a flexible transmissive substrate and an optically clear adhesive.

13. The display screen of claim 11, wherein the seaming tape is approximately 2 inches wide.

14. A large format tiled projection display screen, comprising:
a plurality of modules, each of the modules comprising:
a projection screen film;
a transmissive flexible substrate having a front surface side and
an optically clear adhesive between the projection screen film and the substrate,
wherein at least one of the substrates has a greater size than its corresponding projection screen film,
wherein each of the modules is joined to at least one of the other modules to provide a tiled projection display screen,
wherein when electronic content is projected onto the projection screen films, the electronic content is visible on the front surface sides of the substrates.

15. The display screen of claim 14, wherein the projection screen films each comprise a high contrast rear projection screen.

16. The display screen of claim 15, wherein the rear projection screen comprises beads.

17. The display screen of claim 14, wherein the substrates each comprise a polymeric film.

18. The display screen of claim 17, wherein a polymer for the substrate polymeric film is selected from polyurethane, vinyl, polyester, or polycarbonate.

19. The display screen of claim 14, wherein the projection screen films are each at least approximately 30 inches wide.

20. The display screen of claim 14, wherein the front surface sides of the substrates have an anti-glare function.

21. A large format tiled projection display screen, comprising:
a plurality of modules, each of the modules comprising:
a projection screen film;
a transmissive flexible substrate having a front surface side; and
an optically clear adhesive between the projection screen film and the substrate,
wherein each of the modules is joined to at least one of the other modules to provide a tiled projection display screen,
wherein when electronic content is projected onto the projection screen films, the electronic content is visible on the front surface sides of the substrates,
wherein at least one of the modules has the substrate wider than the projection screen film adhered to the substrate and includes a seam edge portion, wherein another one of the modules has the substrate of the another one module adhered to the seam edge portion.

22. A large format tiled projection display screen, comprising:
a plurality of modules, each of the modules comprising:
a projection screen film;

a transmissive flexible substrate having a front surface side; and an optically clear adhesive between the projection screen film and the substrate, wherein each of the modules is joined to at least one of the other modules to provide a tiled projection display screen, wherein when electronic content is projected onto the projection screen films, the electronic content is visible on the front surface sides of the substrates, further comprising a seaming tape joining at least one of the substrates to another one of the substrates, the seaming tape being adhered to each of the at least one of the substrates and the another one of the substrates.

23. The display screen of claim 22, wherein the seaming tape comprises a flexible transmissive substrate and an optically clear adhesive.

* * * * *